United States Patent
Rinaldi et al.

(10) Patent No.: US 8,563,631 B2
(45) Date of Patent: Oct. 22, 2013

(54) VISCOSITY-REDUCING SUPER-PLASTICISING COPOLYMERS

(75) Inventors: David Rinaldi, Lyons (FR); Horacio Naranjo, Jardin (FR); Martin Mosquet, Bougoin-jallieu (FR); Philippe Maitrasse, Chilleurs aux Bois (FR); Alexandre Desseroir, Sainville (FR)

(73) Assignees: Lafarge, Paris (FR); Chryso, Issy les Moulineaux (FR)

( * ) Notice: Subject to any disclaimer, the term of this patent is extended or adjusted under 35 U.S.C. 154(b) by 0 days.

(21) Appl. No.: 13/260,972

(22) PCT Filed: Mar. 31, 2010

(86) PCT No.: PCT/FR2010/050611
§ 371 (c)(1),
(2), (4) Date: Dec. 19, 2011

(87) PCT Pub. No.: WO2010/112772
PCT Pub. Date: Oct. 7, 2010

(65) Prior Publication Data
US 2012/0095134 A1    Apr. 19, 2012

(30) Foreign Application Priority Data
Apr. 1, 2009    (FR) ..................... 09 52101

(51) Int. Cl.
*C08B 31/12*    (2006.01)
(52) U.S. Cl.
USPC .......................................... 524/50

(58) Field of Classification Search
USPC ............................................ 524/50
See application file for complete search history.

(56) References Cited

U.S. PATENT DOCUMENTS

| | | | |
|---|---|---|---|
| 6,527,850 B2 * | 3/2003 | Schwartz et al. | 106/772 |
| 2004/0260011 A1 | 12/2004 | Yuasa et al. | |
| 2006/0111539 A1 * | 5/2006 | Wamprecht et al. | 528/44 |

FOREIGN PATENT DOCUMENTS

| | | |
|---|---|---|
| EP | 1 734 062 A1 | 12/2006 |
| JP | 9-248438 A | 9/1997 |
| WO | 02/083594 A1 | 10/2002 |
| WO | 2004/099099 A1 | 11/2004 |
| WO | 2004/099100 A1 | 11/2004 |
| WO | 2005/044752 A1 | 5/2005 |
| WO | 2006/037888 A1 | 4/2006 |

OTHER PUBLICATIONS

Yamada, et al., Effects of the chemical structure on the properties of polycarboxylate-type superplasticizer, vol. 30, No. 20, 2000, pp. 197-207.

* cited by examiner

*Primary Examiner* — Ling Choi
*Assistant Examiner* — Lanee Reuther
(74) *Attorney, Agent, or Firm* — McDermott Will & Emery LLP

(57) ABSTRACT

The invention mainly relates to the use of a (co)polymer having a main chain essentially consisting of (meth)acrylic units and polyoxyalkylated side-chains containing statistically-distributed hydrophobic units as an adjuvant for lowering the viscosity of hydraulic compositions.

13 Claims, 1 Drawing Sheet

VISCOSITY-REDUCING SUPER-PLASTICISING COPOLYMERS

CROSS REFERENCE TO PRIOR APPLICATIONS

Figure 1:
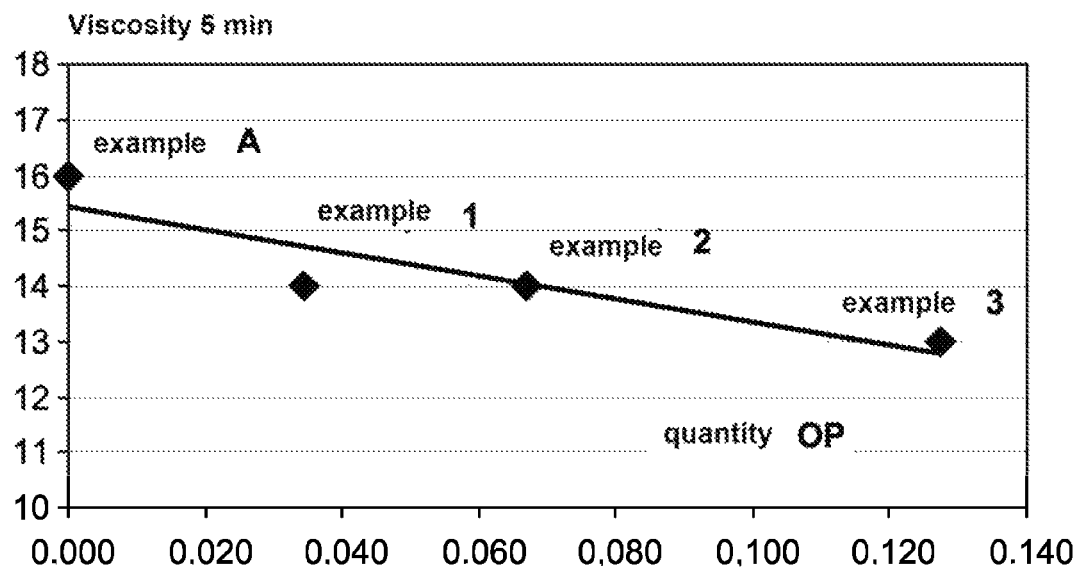

This application is a U.S. National Phase application under 35 U.S.C. §371 of International Application No. PCT/FR2010/050611, filed on Mar. 31, 2010 and claims benefit of priority to French Patent Application No. 09 52101, filed on Apr. 1, 2009. The International Application was published in French on Oct. 7, 2010 as WO 2010/112772 A2 under PCT Article 21(2). All of these applications are herein incorporated by reference.

The present invention concerns the use of specific polyalkoxylated polycarboxylic (co)polymers for improving the viscosity of hydraulic compositions.

When laying fluid concrete on a worksite, one important criterion of performance relates to the viscosity of the concrete. Low viscosity is useful since it allows accelerated preparation, transfer and placing in position. This is particularly desirable for self-levelling concrete formulations. In practice, the viscosity of the concrete can be measured via the flow time of a given volume of concrete through a flow cone. The shorter the flow time the lesser the viscosity of the concrete and the easier it is to pour into place.

It is therefore frequent to add water to concrete during transport from the manufacturing unit or at the worksite if the concrete has lost fluidity. Yet, while the addition of water allows a reduction in the viscosity of a concrete formulation, it may also lead to degradation of mechanical strength and increased risks of cracking which may give rise to litigation regarding the hardened concrete.

The discovery of the exceptional dispersing properties of comb-structured polyalkoxylated polycarboxylate (co)polymers (PCPs), also called super-plasticisers, has enabled concrete technology to develop rapidly. However, it cannot be presumed from their water-reducing effect that they have a viscosity-lowering effect on concrete since such lowering effect proves to be highly variable.

These super-plasticisers are (co)polymers having a comb-like structure, whose main polymeric chain comprises carboxylic groups carrying side chains composed of sequences of polyether type.

To improve the viscosity-reducing capability of adjuvants of PCP type, patent application WO 2004/099100 describes mixtures of (co)polymers of which one has been modified by inserting a hydrophobic group in the side chain. These mixtures of (co)polymers are fairly complex however, and both the formulation and the properties thereof may be difficult to control.

Also, patent application WO 2004/099099 proposes (co)polymers obtained by polymerising 20 to 60% by weight of alkyl methacrylate, 15 to 40 mole % of unsaturated monomer carrying a polyalkylene glycol chain and 19 to 65 mole % of a carboxylic acid. According to this document, only the (co)polymers prepared when observing these ranges give favourable results.

Patent application JP 09248438 describes (co)polymers comprising a main chain that in particular essentially consists of (meth)acrylic units, and polyoxyalkylated side chains comprising statistically-distributed hydrophobic units as adjuvant to lower the viscosity of hydraulic compositions.

It is therefore one objective of the invention to propose specific adjuvants with which it is possible to improve viscosity, in particular by reducing the viscosity of formulations of hydraulic compositions whilst maintaining water-reducing properties of interest.

A further objective is to propose such adjuvants which are inexpensive and easy to manufacture at industrial level.

This objective is achieved through the use of (co)polymers comprising a main chain essentially obtained from (meth)acrylic monomers and from side chains of polyoxyalkylated type comprising statistically-distributed hydrophobic units as adjuvant in order to lower the viscosity of hydraulic compositions.

The invention is based on the unexpected finding that the association, within a (co)polymer, of units derived from (meth)acrylic monomers in the main chain and of side chains of polyoxyalkylated type comprising statistically-distributed hydrophobic units, accessible via a simple low-cost preparation method, imparts behaviour of interest to the polymers with respect to lowered viscosity.

In the remainder hereof, the term <<comb polymer>> designates (co)polymers comprising a main chain and side chains.

The term <<(co)polymer>> encompasses polymers and copolymers obtained by polymerising a single or several monomers respectively.

The term <<(meth)acrylic monomers>> encompasses acrylic monomers and methacrylic monomers.

By the term <<hydraulic compositions>>, is meant the defining of any composition having hydraulic setting and more particularly cement, mortars and concretes intended for all construction sectors (building, civil engineering or prefabrication plant).

By the term <<hydrophobic group>> or <<hydrophobic unit>> is meant a group making a negative contribution towards the calculation of HLB according to Davies' theory (J. T. Davies, Proc. Intern. Congr. Surface Active Substances, 2nd, London, Vol. I, p. 426 (1957)). HLB values may be the following for example:

| Groups | HLB as per Davies theory |
| --- | --- |
| —$OSO_3$ Na | +38.7 |
| —COOK | +21.1 |
| —COO Na | +19.1 |
| —N ternary amine | +9.4 |
| Ester (sorbitan) | +6.8 |
| Ester (free) | +2.4 |
| —COOH | +2.1 |
| —OH (free) | +1.9 |
| —O— | +1.3 |
| —OH (sorbitan) | +0.5 |
| —$CH_2$—$CH_2$—O— (ethylene oxide group) | +0.33 |
| —$CH(CH_3)$—$CH_2$—O— (propylene oxide group) | −0.015 |
| —$CH_3$, —$CH_2$—, =CH— | −0.475 |

Preferably the hydrophobic unit comprises or consists of oxyalkylene groups comprising more than 2 carbon atoms and more particularly at least three carbon atoms. Preferably, the hydrophobic groups are oxypropylene and oxybutylene groups, preferably oxypropylene groups.

By the term <<statistic distribution>> it is meant to designate an irregular distribution and hence not a block distribution of the hydrophobic units in the side chain. This type of distribution is particularly obtained by reaction in the presence of the different species and its structure is dependent in particular upon their respective reactivity. This term is particularly intended to cover the distributions present in so-called graded or tapered (co)polymers comprising chains in which the concentration of a unit increases gradually along the chain. This term is also intended to cover distributions comprising a chain terminal end having at least one non-hydrophobic group, in particular an oxyethylene group.

According to the invention, the (co)polymer used is of specific constitution both at the main chain and at the side chains.

The (co)polymer used according to the invention comprises a main chain, essentially consisting of (meth)acrylic units, and side chains of polyoxyalkylated type comprising 1 to 80% by weight relative to the dry polymer of statistically-distributed hydrophobic units.

By the term <<essentially consisting of>> is meant a proportion of at least 50%, preferably at least 80% and further preferably at least 95% by weight of monomer relative to the total monomers. According to one preferred embodiment the (co)polymer used according to the invention only comprises (meth)acrylic units.

Preferably the main chain has a degree of polymerisation of 15 to 45, in particular of 20 to 40.

According to one embodiment of the invention, the (meth)acrylic units in the (co)polymer used are of following formula (I):

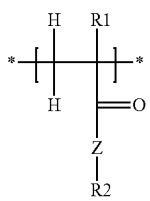

wherein:
$R^1$ is hydrogen or methyl;
Z is O or NH; and
$R^2$ is H or an alkyl, aryl, alkylaryl, arylalkyl group with 1 to 20 carbon atoms, or $-Q-R^3$ group in which $R^3$ is H or an alkyl, aryl, alkylaryl, arylalkyl group with 1 to 20 carbon atoms, and Q is of formula (II):

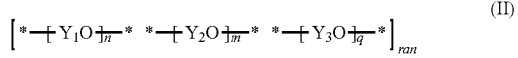

wherein:
$Y_1$ represents an alkylene group with 2 carbon atoms;
$Y_2$ represents an alkylene group with 3 carbon atoms;
$Y_3$ represents an alkylene group with 4 carbon atoms;
n is an integer of 1 to 200;
m is an integer of 0 to 150;
q is an integer of 0 to 150; and
(n+m+q) is an integer of 1 to 500, bearing in mind that the (co)polymer of formula (I) comprises at least one Q group in which m or q>0.

The mention <<ran>> indexing the square brackets in formula (II) means that the groups $Y_1O$ to $Y_3O$ are distributed statistically within the Q group.

In the (co)polymer used in the invention, it is not necessary for each of the Q groups to comprise $Y_2O$ or $Y_3O$ groups. However, the mean ratio n/(n+m+q) preferably varies between 0.2 and 0.99.

Preferably, the mean molecular weight of the side chains is between 500 and 5000 g/mol.

Preferably, the (co)polymer is able to be obtained by radical polymerisation of a (meth)acrylic monomer of following formula (Ia):

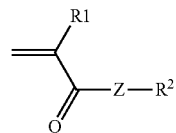

in which the substituents $R^1$, Z and $R^2$ have the same meaning as in previous formula (I).

In the above-cited formulas (I) (Ia) and (II), the following characteristics are particularly preferred:
Z is O;
$R^2$ is a $-Q-R^3$ group in which:
  $R^3$ represents a methyl or ethyl group, preferably a methyl group;
  n is an integer varying from 1 to 150, preferably 1 to 100;
  m is an integer varying from 1 to 100, preferably 1 to 75; and
  q is 0;
the mean ratio n/(n+m+q) varies from 0.5 to 0.99.

Advantageously, the described (co)polymers can be composed of different units. In particular, it may be of interest to insert different side chains into their length and/or the number and arrangement of the hydrophobic units.

Also, the described (co)polymers may also comprise other units in the main chain. In particular, it may be of interest to insert units derived from maleic monomers, in particular chosen from the group of maleic acid, maleic anhydride, the hemi-esters of maleic acid with alcohols, glycols or amines comprising 1 to 10 carbon atoms and optionally alkoxylated with 1 to 500 oxyalkylene units. These units may also optionally carry side chains of polyoxyalkylated type comprising statistically-distributed hydrophobic units.

The content of said units in the (co)polymer is however preferably less than 35%, more preferably less than 25% in number. Particularly preferred are the polymers whose chain consists of (meth)acrylic units to the exclusion of any other units. In the absence of an allylic monomer, the percentage of this type of units may reach up to 49% in number.

Advantageously, the (co)polymer of the invention comprises at least 3% hydrophobic units, preferably at least 17% hydrophobic units in weight percent relative to the weight of the (co)polymer.

Preferably, the (co)polymer of the invention comprises no more than 60% of hydrophobic units in weight percent relative to the weight of the (co)polymer.

According to the invention, the (co)polymer includes side chains of oxyalkylene type comprising hydrophobic units statistically distributed in the chain.

The (co)polymers having this type of distribution are particularly easy to prepare, since the polyoxyalkylated chain can be synthesized in a single step, in the presence of the different alkylene oxides, instead of a method comprising several steps as is most often the case for preparing block (co)polymers for example.

The oxyalkylene side chain can be present on the monomer or monomers before polymerisation, or it may result from an esterification reaction after polymerisation.

When the side chains of oxyalkylene type comprising hydrophobic units are carried by the monomer, the (co)polymers can therefore be obtained by the copolymerisation, preferably of radical type, of suitable monomers. (Co)polymerisation can be performed via conventional radical route as described for example in patent application n° PCT/FR2005/002438.

As a variant, the side chains can be inserted by reaction of a polycarboxylic acid with a suitable polyether, following the method described for example in application FR 2 776 285.

According to one variant, the (co)polymer is able to be obtained by post-esterification, a method in which the following are caused to react in the presence of water and a catalyst at a temperature of between 120 and 250° C.:

at least one polycarboxylic acid obtained by polymerising at least one unsaturated carboxylic acid; and at least one polyether containing a free hydroxyl group capable of reacting with a carboxylic function of the said polycarboxylic acid, the catalyst being an alkaline or alkaline-earth salt of a strong protic acid.

The catalyst can be chosen in particular from among the salts of alkyl-, alkylaryl-, aryl- or arylalkylsulphonic acids, alkyl-, alkylaryl-, aryl- or arylalkylphosphoric acids, alkyl-, alkylaryl-, aryl- or arylalkylphosphonic acids and alkyl-, alkylaryl-, aryl- or arylalkylsulphate acids. The catalyst is an alkaline or alkaline-earth salt of the above-defined acids, and notably includes the salts of Na, K, Li, Ca and Mg. The catalyst can be added in a quantity of 0.04 mole % to 10 mole % relative to the number of carboxylic functions of the polycarboxylic acid.

Preferably, the polycarboxylic acid is obtained by polymerising monomers containing (meth)acrylic acid as essential component. Optionally, the polycarboxylic acid can also be derived from other comonomers with a different functionality to a carboxylic acid having one or more ethylene unsaturations which can be copolymerised with (meth)acyrlic acid, such as maleic acid and the anhydride of maleic acid, or the monomers comprising sulphonic, sulphate acid, phosphoric, phosphonic and vinyl methallyl groups.

Preferably, the polycarboxylic acid is a homopolymer and/or a (co)polymer of (meth)acrylic acid or a (co)polymer of (meth)acrylic acid with maleic acid or maleic anhydride. The weight average molecular weight Mw of the polycarboxylic acid is preferably between 500 and 60 000, in particular between 500 and 3800, and more particularly between 1000 and 3500.

The polyether may in particular be a polyalkylene glycol alkylether of formula HO-Q-$R^3$ in which $R^3$ and Q are such as indicated for above-described formula (II). This type of macromonomer can be obtained for example via anionic polymerisation with several alkylene oxides in the presence of a strong base. For example, 5 to 80 mole % of polyether are added relative to the number of available carboxylic functions of the polycarboxylic acid.

Preferably, the polyether consists of:

one or more alkylethers of polyethylene glycol, containing oxypropylene units differing in their weight average molecular weight; or one or more alkylethers of polypropylene glycol containing oxyethylene units differing in their weight average molecular weight, or a mixture of the alkylethers thus defined.

The mean molecular weight of the polyether may vary from 150 to 30 000, preferably from 300 to 10000, more preferably from 300 to 5000, further preferably from 500 to 5000, and most preferably from 1000 to 3000.

The quantity of polyether used in the described method will depend upon the desired degree of esterification.

The esterification reaction can be conducted so as to esterify a portion e.g. 5 to 80%, of the carboxylic functions with a polyether or mixture of polyethers. It is generally conducted under reduced pressure so as gradually to eliminate the water formed during the reaction. The reduced pressure is generally between 5 and 150 mbars. The reaction is halted as soon as the targeted percentage of esterified carboxylic functions of the polycarboxylic acid has been reached.

The weight average molecular weight <<Mw>> of the dispersant copolymer measured by gel permeation chromatography with polyethylene glycol calibration, generally varies between about 1000 and about 1 000 000, preferably between about 10 000 and about 80 000, more preferably 10 000 to 50 000, and further preferably 15 000 to 45 000. Unless otherwise indicated in the present application, the molecular weights are expressed in g/mol, the unit generally being omitted.

Advantageously, the (co)polymer used according to the invention can be used without any subsequent purification. When it has been prepared following the above-described method, the (co)polymer can be used in native form or at a chosen level of neutralisation by using a base or mixture of bases known to persons skilled in the art, for example sodium hydroxide, lithium hydroxide, potassium hydroxide, calcium hydroxide or a primary, secondary or tertiary amine.

The (co)polymer used according to the invention is generally packed in solution form, in particular an aqueous solution, or in a solvent, in dispersion or in powder form. Preferably it is used in the form of an aqueous solution, for example at a concentration of 20 to 80% preferably 20 to 40 dry weight %.

Also, the formulation may further comprise an anti-foaming agent to correct the air content of the hydraulic composition. The formulation and proportion of anti-foaming agent will depend on the desired structure of the dispersing polymer and air content.

The results obtained show that the viscosity-reducing effect at 5 minutes is proportional to the quantity of hydrophobic groups relative to the binder. Therefore the dosage of (co)polymer can be adjusted so that the content of hydrophobic groups in the composition of hydraulic binder is between 0.02 and 0.5 weight % relative to the weight of binder, according to the desired effect.

Finally, the formulated (co)polymer can be used alone or in combination with one or more other additives such as an accelerating, retarding agent or other dispersant to adjust the rheological and setting properties of the material.

The (co)polymer can be used with compositions containing hydraulic cement such as Portland CEM I cement; aluminous cements, various composite cements CEM II or CEM III formed, before or after crushing Portland clinker and slag, by mixing natural pozzolan and/or fly ash; or hydraulic materials other than cement such as hydraulic calcium sulphates, binders containing CSAs (calcium sulpho-aluminates), hydraulic glass; magnesium and phosphate binders.

The described adjuvants can be used for different hydraulic compositions, in particular for compositions of concrete, mortar, adjuvants, slurries, screeds or pastes.

The use of the described (co)polymers is of particular interest for lowering the viscosity of concrete compositions having a W/C ratio (weight ratio of water and cement) of between 0.15 and 1, preferably between 0.2 and 0.8.

They are of particular interest for self-levelling/self-compacting concretes (SLC/SCC), ready-to-use concretes, or concretes intended for the prefabrication sector.

Figure 2:
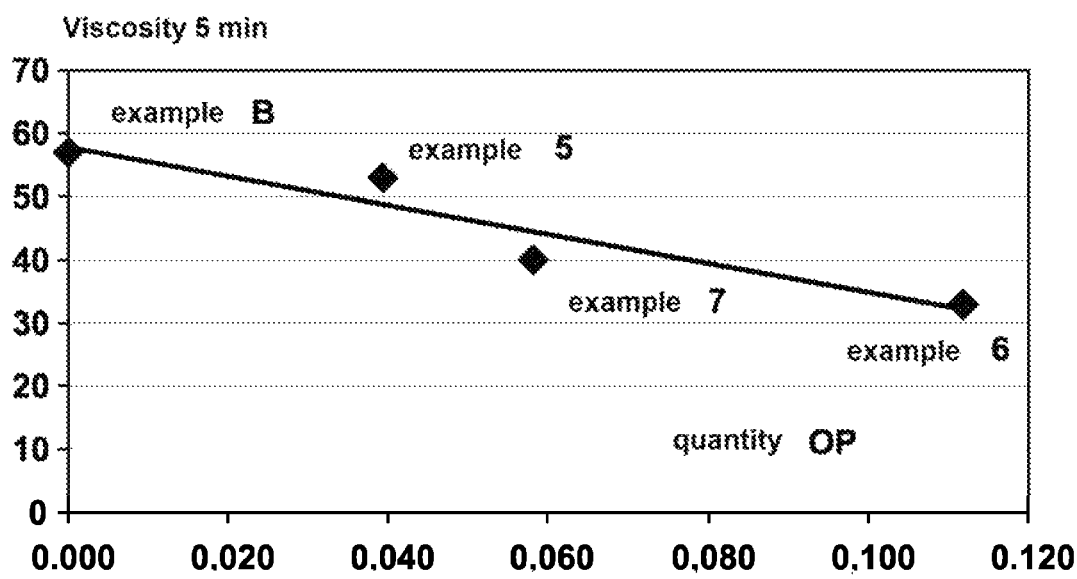

The invention is described below in more detail by means of the following Figures and Examples:

FIG. 1: a diagram showing the effect of hydrophobic group dosage on viscosity at 5 minutes for acrylic (co)polymers; and FIG. 2: a diagram showing the effect of hydrophobic group dosage on viscosity at 5 minutes for methacrylic (co)polymers.

EXAMPLES

Unless indicated to the contrary, the percentages given below are to be construed as weight percentages relative to the weight of the final formulation.

Example A

Example for Comparison

A four-neck flask fitted with a stirrer and heating means, and connected to a water jet filter pump, was charged with 25 g of polyacrylic acid (Mw=2000, measured acid titre=330 mg KOH/g, dry extract 49 wt. %) followed by 0.34 g (5.5 mole % of the carboxylic functions of the polyacrylic acid) of lithium hydroxide. Next, 73.66 g g (25 mole % of the carboxylic functions of the polyacrylic acid) of methoxylated ethylene polyoxide of molecular weight Mw 2000 (MPEG2000) were added to the medium. The reaction mixture was brought to a temperature of 80° C. and gradually placed under a vacuum (pressure of about 50 mbar). After distillation of the water, the temperature of the reaction medium was gradually increased to 175° C. The reaction time was measured from the moment when the reaction medium reached 170° C. The reaction was continued for a time of 6 h.

The progress of the esterification reaction was monitored by assay of non-reacted MPEG, using GPC, by comparing the peak area with a previously determined calibration curve. The content of residual polyether is given in Table 1 below.

After the reaction, the reaction medium was returned to atmospheric pressure and the heat turned off. Once the temperature of the reaction medium had dropped to below 90° C., the melted polymer was diluted to 50 weight % in water.

Example B

Example for Comparison

A four-neck flask fitted with a stirrer and heating means, and connected to a water jet filter pump, was charged with 25.0 g of polymethacrylic acid (Mw=4000 i.e. a degree of polymerisation of the main chain of about 47, measured acid titre=184.8 mg KOH/g, dry extract 30.4 wt. %) followed by 2.0 g (2.5 mole % of the carboxylic functions of the polymethacrylic acid) of a 50 wt. % solution of sodium hydroxide.

To the medium were then added 30.1 g (18.25 mole % of the carboxylic functions of the polymethacrylic acid) of methoxylated ethylene polyoxide of molecular weight Mw 2000 (MPEG 2000) and 11.3 g (18.25 mole % of the carboxylic functions of the polymethacrylic acid) of methoxylated ethylene polyoxide of molecular weight Mw 750 (MPEG 750).

The reaction medium was brought to a temperature of 80° C. and gradually placed under a vacuum (pressure of about 50 mbar). After distillation of the water, the temperature of the reaction medium was gradually brought to 175° C. The reaction time was measured from the moment when the reaction medium reached 170° C. The reaction was continued for a time of 8 h30. The residual polyether content is given in Table 1 below.

On completion of the reaction, the reaction medium was returned to atmospheric pressure and the heat turned off. Once the temperature of the reaction medium was below 90° C., the melted polymer was diluted to 50 weight % in water.

Example C

Example for Comparison

A four-neck flask fitted with a stirrer and heating means, and connected to a water jet filter pump, was charged with 50 g of polymethacrylic acid (Mw=4000 i.e. a degree of polymerisation of the main chain of about 47, measured acid titre=184.8 mg KOH/g, dry extract 30 wt. %) followed by 0.34 g (2.5 mole % of the carboxylic functions of the polymethacrylic acid) of a 50 weight % solution of sodium hydroxide.

To the medium were then added 95.76 g (29 mole % of the carboxylic functions of the polymethacrylic acid) of methoxylated ethylene polyoxide of molecular weight Mw 2000 (MPEG2000) containing 20 mole % propylene oxide statistically distributed along the chain which is terminated by a methoxy group. The reaction mixture was brought to a temperature of 80° C. and gradually placed under a vacuum (pressure of about 50 mbar). After distillation of the water, the temperature of the reaction medium was gradually brought to 175° C. The reaction time was measured from the moment when the reaction medium reached 170° C. The reaction was continued for a time of 6 h.

The progress of the esterification reaction was monitored by assay of non-reacted MPEG, using GPC, by comparing the peak area with a previously determined calibration curve. The residual polyether content is given in Table 1 below.

On completion of the reaction, the reaction medium was returned to atmospheric pressure and the heat turned off. Once the temperature of the reaction medium was below 90° C., the melted polymer was diluted to 50 weight % in water.

Example D

Example for Comparison

A four-neck flask fitted with a stirrer and heating means, and connected to a water jet filter pump, was charged with 50 g of polymethacrylic acid (Mw=4000 i.e. a degree of polymerisation of the main chain of about 47, measured acid titre=184.8 mg KOH/g, dry extract 30 wt. %) followed by 0.34 g (2.5 mole % of the carboxylic functions of polymethacrylic acid) of a 50 weight % solution of sodium hydroxide.

To the medium were then added 102.31 g (31 mole % of the carboxylic functions of the polymethacrylic acid) of methoxylated ethylene polyoxide of molecular weight Mw 2000 (MPEG2000) containing 10 mole % of propylene oxide statistically distributed along the chain which is terminated by a methoxy group. The reaction medium was brought to a temperature of 80° C. and gradually placed under a vacuum (pressure of about 50 mbar). After distillation of the water, the temperature of the reaction medium was gradually brought to 175° C. The reaction time was measured from the moment when the reaction medium reached 170° C. The reaction was continued for a time of 6 h.

The progress of the esterification reaction was monitored by assay of non-reacted MPEG, using GPC, by comparing the peak area with a previously determined calibration curve. The residual polyether content is given in Table 1 below.

On completion of the reaction, the reaction medium was returned to atmospheric pressure and the heat turned off.

Once the temperature of the reaction was below 90° C., the melted polymer was diluted to 50 weight % in water.

Example 1

A four-neck flask fitted with a stirrer and heating means, and connected to a water jet filter pump, was charged with 25 g of polyacrylic acid (Mw=2000 i.e. a degree of polymerisation of the main chain of about 28, measured acid titre=330 mg KOH/g, dry extract 49 wt. %) followed by 0.34 g (5.5 mole % of the carboxylic functions of the polyacrylic acid) of lithium hydroxide.

To the medium were then added 73.66 g (25 mole % of the carboxylic functions of the polyacrylic acid) of polyether (ethylene polyoxide/propylene polyoxide of molecular weight Mw 2000 containing 10 mole % of propylene oxide statistically distributed along the chain which is terminated by a methoxy group).

The reaction medium was brought to a temperature of 80° C. and gradually placed under a vacuum (pressure of about 50 mbar). After distillation of the water, the temperature of the reaction medium was gradually increased to 175° C. The reaction time was measured from the moment when the reaction medium reached 170° C. The reaction was continued for a time of 8 h30. The residual polyether content is given in Table 1 below.

On completion of the reaction, the reaction medium was returned to atmospheric pressure and the heat turned off. Once the temperature of the reaction medium was below 90° C., the melted polymer was diluted in 50 weight water.

A four-neck flask fitted with a stirrer and heating means, and connected to a water jet filter pump, was charged with 25 g of polyacrylic acid (Mw=2000, measured acid titre=330 mg KOH/g, dry extract 49 wt. %) followed by 0.86 g (28.7 g of a 3 wt. % solution, 3 mole % carboxylic functions of the polyacrylic acid) of sodium p-toluenesulphonate.

To the medium were then added 73.66 g (25 mole % of the carboxylic functions of the polyacrylic acid) of ethylene polyoxide/propylene polyoxide of molecular weight Mw 2000 containing 50 mole % of propylene oxide statistically distributed along the chain which is terminated by a methoxy group.

The reaction medium was brought to a temperature of 80° C. and gradually placed under a vacuum (pressure of about 50 mbar). After distillation of the water the temperature of the reaction medium was gradually brought to 175° C. The reaction time was measured from the moment the reaction medium reached 170° C. The reaction was continued for a time of 8 h30.

The progress of the esterification reaction was monitored by assay of non-reacted MPEG (methoxy-terminated polyether), using GPC, by comparing the peak area with a previously determined calibration curve.

On completion of the reaction, the reaction medium was returned to atmospheric pressure and the heat turned off. Once the temperature of the reaction medium was below 90° C., the melted polymer was diluted to 50 weight % in water.

The residual polyether content is indicated in Table 1 above.

TABLE 1 constitution of the tested (co)polymers

| Example | Polycarboxylic acid | Degree of polymerisation of the main chain | Polyether Molecular weight | Oxyprop. [mole %] | Targeted ester content [mole %] | Residual polyether [wt. %] |
|---|---|---|---|---|---|---|
| A | Acrylic | 28 | 2000 | 0 | 25 | 4.7 |
| B | Methacrylic | 47 | 2000/750 | 0/0 | 36.5 | 3.2 |
| C | Methacrylic | 47 | 2000 | 20 | 29 | 7.8 |
| D | Methacrylic | 47 | 2000 | 10 | 31 | 8.2 |
| 1 | Acrylic | 28 | 2000 | 10 | 25 | 6.5 |
| 2 | Acrylic | 28 | 2000 | 20 | 25 | 9.9 |
| 3 | Acrylic | 28 | 2000 | 50 | 25 | 11.5 |
| 4 | Acrylic | 28 | 2000 | 10* | 25 | 8.5 |
| 5 | Methacrylic | 47 | 2000/750 | 10/0 | 36.5 | 3.5 |
| 6 | Methacrylic | 47 | 2000/750 | 30/0 | 36.5 | 3.1 |
| 7 | Methacrylic | 47 | 2000/750 | 50/0 | 36.5 | 3.8 |
| 8 | Methacrylic | 35 | 2000 | 20 | 29 | 9.6 |
| 9 | Methacrylic | 35 | 2000 | 10 | 29 | 9.4 |
| 10 | Methacrylic | 35 | 2000 | 30 | 29 | 9.9 |

*mean, the polyether comprises chains with 50% and 0% PO

Example 2

Example 1 was repeated under the same operating conditions but replacing the polyether with a MPEG of molecular weight 2000 with 20 mole % oxypropylene units. The reaction was halted after 8 h30. The residual polyether content is given in Table 1 above.

Example 3

First the catalyst solution was prepared by neutralising p-toluene sulphonic acid in an aqueous solution whose pH brought to a pH of between 7 and 10 using sodium hydroxide (50%, then 1N and finally 0.1N).

Example 4

To examine the influence of the arrangement of the hydrophobic groups, Example 1 was repeated under the operating conditions of Example 3 but replacing the polyether by a mixed PO/EO MPEG of same molecular weight comprising a chain with a PO/(EO+PO) molar ratio of 50% and a chain of 100% oxyethylene units. Given the proportion between the 2 chains, the MPEG on average comprises 10 mole % of oxypropylene units per chain. The reaction was halted after 6 hours. The content residual polyether content is given in Table 1 above.

Example 5

A four-neck flask fitted with a stirrer and heating means, and connected to a water jet filter pump was charged with [25.0] g of polymethacrylic acid (Mw=4000, measured acid titre=184.8 mg KOH/g, dry extract 30.4 wt. %) followed by 2.0 g (2.5 mole % of the carboxylic functions of the polymethacrylic acid) of a 50 weight solution of sodium hydroxide.

To the medium were then added 30.1 g (18.5 mole % of the carboxylic functions of the poymethacrylic acid) of ethylene polyoxide/propylene polyoxide of molecular weight Mw 2000 containing 10 mole % of propylene oxide statistically distributed along the chain which is terminated by a methoxy group, and 11.3 g (18.5 mole % of the carboxylic functions of the polymethacrylic acid) of methoxylated polyoxide of molecular weight Mw 750 (MPEG750).

The reaction medium was brought to a temperature of 80° C. and gradually placed under a vacuum (pressure of about 50 mbar). After distillation of the water the temperature of the reaction medium was gradually brought to 175° C. The reaction time was measured from the moment when the reaction medium reached 170° C. The reaction was continued for a time of 8 h30. On completion of the reaction, the reaction medium was returned° to atmospheric pressure and the heat turned off. Once the temperature of the reaction medium was below 90° C., the melted polymer was diluted to 50 weight % in water. The measured content of residual polyether is given in Table 1 above.

Example 6

Example 5 was repeated under the same operating conditions but by replacing the polyether of molecular weight Mw 2000 by an ethylene polyoxide/propylene polyoxide of molecular weight Mw 2000 containing 30 mole % of propylene oxide statistically distributed along the chain which is terminated by a methoxy group. The reaction was halted after 8 h30. The measured content of residual polyether is given in Table 1 above.

Example 7

Example 5 was repeated under the same operating conditions but replacing the polyether of molecular weight Mw 2000 by an ethylene polyoxide/propylene polyoxide of molecular weight Mw 2000 containing 50 mole % of propylene oxide statistically distributed along the chain which is terminated by a methoxy group. The reaction was halted after 8 h30. The measured content of residual polyether is given in Table 1 above.

Example 8

Example 8 is similar to Example C with the difference that the polymethacrylic acid (Mw=4000) is replaced by polymethacrylic acid of molecular weight Mw 3100 g/mol, corresponding to a degree of polymerisation of about 35.

More precisely, a four-neck flask fitted with a stirrer and heating means and connected to a water jet filter pump was charged with 50 g of polymethacrylic acid (Mw=3100, measured acid titre=166 mg KOH/g, dry extract 30 wt. %) followed by 0.32 g (2.5 mole % of the carboxylic functions of the polymethacrylic acid) of a 50 weight % sodium hydroxide solution.

To the medium were then added 86.01 g (29 mole % of the carboxylic functions of the polymethacrylic acid) of methoxylated ethylene polyoxide of molecular weight Mw 2000 containing 20 mole % of propylene oxide statistically distributed along the chain which is terminated by a methoxy group.

The reaction medium was brought to a temperature of 80° C. and gradually placed under a vacuum (pressure of about 50 mbar). After distillation of the water the temperature of the reaction medium was gradually brought to 175° C. The reaction time was measured from the moment when the reaction medium reached 170° C. The reaction was continued for a time of 8 h30. On completion of the reaction, the reaction medium was returned to atmospheric pressure and the heat turned off. Once the temperature of the reaction medium was below 90° C., the melted polymer was diluted to 50 weight % in water. The measured content of residual polyether is given in Table 1 above.

Example 9

Example 8 was repeated under the same operating conditions but replacing the polyether of molecular weight Mw 2000 by an ethylene polyoxide/propylene polyoxide of molecular weight Mw 2000 containing 10 mole % of propylene oxide statistically distributed along the chain which is terminated by a methoxy group. The reaction was halted after 8 h30. The measured content of residual polyether is given in Table 1 above.

Example 10

Example 8 was repeated under the same operating conditions but replacing the polyether of molecular weight Mw 2000 by an ethylene polyoxide/propylene polyoxide of molecular weight Mw 2000 containing 30 mole % of propylene oxide statistically distributed along the chain which is terminated by a methoxy group. The reaction was halted after 8 h30. The measured content of residual polyether is given in Table 1 above.

Examples of Application

The polymers obtained in Examples 1 to 10 were tested as adjuvants for different hydraulic compositions and compared with the polymers according to Examples A, B, C and D.

Unless indicated to the contrary, the polymers were used without any subsequent purification, such as obtained after the reaction, after neutralisation and dilution to 20% by weight in an aqueous solution.

The performance of the polymers as adjuvants of hydraulic compositions was evaluated by testing the viscosity and slump flow of the test mortars.

Different mortar formulations were used, called mortar I and mortar II hereafter. Their composition is given in Table 2 below.

TABLE 2

Composition of mortars I and II

| Component | Mortar I [g] | Mortar II [g] |
|---|---|---|
| Standard sand | 1350 | 1350 |
| Fulchiron E2 LS | 200.1 | 557.7 |
| CEMI 52.5 cement, Saint Pierre La Cour | 480.4 | 624.9 |

TABLE 2-continued

Composition of mortars I and II

| Component | Mortar I [g] | Mortar II [g] |
|---|---|---|
| Erbray Filler | 340.8 | 412.1 |
| Total mixing water | 326.7 | 375.1 |
|  | (of which 100 for pre-wetting) | (of which 100 for pre-wetting) |
| Water/Cement ratio | 0.680 | 0.60 |

The cement used was CEM I 52.5 by Saint Pierre La Cour (Supplier: Lafarge).

The respective proportions of adjuvants indicated in Table 3 are expressed as dry matter relative to the quantity of cement.

The mortar was prepared under constant hygrometry and temperature (20±1° C.–70±5% relative humidity).

To neutralise any possible foaming effect of the adjuvants, a dose of tributylphosphate (1% relative to the adjuvant solution) was added at the same time as the (co)polymer to the mixing water.

a) Preparation of the Mortar

The mortar was prepared in the following manner:

Standard sand was placed in the vessel of a mixer (Perrier BA 008). About 6% by weight of wetting water relative to the sand was added, mixing at a speed of about 140 rpm over 30 seconds. Mixing was continued for 30 seconds before leaving the mass to stand for 4 minutes. The cement and limestone filler were then added (Source: ERBRAY supplied by MEAC) and mixed for 1 minute before adding the mixing water and the specified proportion of adjuvant whilst continuing mixing. After these steps, mixing was continued for a further 2 minutes at 280 rpm.

b) Fluidifying and Viscosity-Reducing Effect

The fluidifying effect and viscosity-reducing effect were measured using micro-concrete tests.

The fluidifying effect was evaluated by measuring the slump flow of a mortar on a glass plate.

The quantity of adjuvant was proportioned so as to obtain sufficient initial fluidification i.e. slump flow value of 320 to 350 mm. The initial dosage is indicated in weight % (dry polymer) relative to the weight of the cement. The initial set time was 5 minutes after adding the cement to the mixture of wet sands.

Viscosity was also evaluated by measuring the flow time of the mortar through a truncated funnel having a diameter of 150 mm at the base and 17 mm at the top, and comprising two reference marks separated by 60 mm, the first being at 12 mm away from the base.

The viscosity of the mortar corresponds to the value in seconds of the time needed for the mortar to flow through the funnel from reference mark 1 to reference mark 2.

The viscosity-reducing effect of an adjuvant is ascertained by comparing the viscosity values of micro-concretes for comparable slump flow.

TABLE 3

Effects of acrylic polymers on the viscosity of test mortars (mortar I)

| Example | Mortar | Dosage* |  | Time (min) 5 |
|---|---|---|---|---|
| A | I | 0.20 | Slump flow | 330 |
|  |  |  | Viscosity | 16 |
| 1 | I | 0.33 | Slump flow | 330 |
|  |  |  | Viscosity | 14 |
| 2 | I | 0.33 | Slump flow | 330 |
|  |  |  | Viscosity | 14 |
| 3 | I | 0.27 | Slump flow | 330 |
|  |  |  | Viscosity | 13 |
| 4 | I | 0.20 | Slump flow | 345 |
|  |  |  | Viscosity | 13 |

*in % dry matter/weight of cement

It is ascertained that the substitution of oxyethylene groups, in the side chains of polymers of PCP acrylic monomer type, by oxypropylene groups of hydrophobic nature allows lowering of the viscosity of mortar formulations.

It is effectively found that even a very small presence of hydrophobic groups has a notable effect on the reduction in viscosity. For example the adjuvant according to Example A not containing any propylene oxide shows a higher flow value than Examples 1 to 4 which contain hydrophobic groups namely propylene oxide members.

The presence of 50% oxypropylene groups in the polymer of Example 3 allows the dosage to be lowered whilst allowing a reduction in viscosity.

The polymer according to Example 4 allows evaluation of the effect of the arrangement of the hydrophobic groups in the polymer, since it comprises side chains having 50% oxypropylene units and side chains formed solely of oxyethylene units. A substantial reduction in initial viscosity is also ascertained. It would therefore appear that it is the global group content that is concerned.

TABLE 4

Effects of methacrylic polymers on viscosity - CEM I SPLC (mortar II)

| Example | Mortar | Dosage* |  | Time (min) 5 |
|---|---|---|---|---|
| B | II | 0.52 | Slump flow | 310 |
|  |  |  | Viscosity | 57 |
| 5 | II | 0.52 | Slump flow | 310 |
|  |  |  | Viscosity | 53 |
| 6 | II | 0.52 | Slump flow | 335 |
|  |  |  | Viscosity | 33 |
| 7 | II | 0.17 | Slump flow | 310 |
|  |  |  | Viscosity | 40 |

It is ascertained that the substitution of oxyethylene groups in the side chains of methacrylic monomer-containing PCP-type polymers by oxypropylene groups of hydrophobic nature allows lowering of the viscosity of mortar formulations.

FIGS. 1 and 2 show that the viscosity-reducing effect is related to the quantity of hydrophobic groups added to the binder mix, both for the acrylic (co)polymers and for the methacrylic (co)polymers. It is effectively found that within the examined time range, the drop in viscosity is proportional to the product of dosage and hydrophobic group content of the (co)polymer.

TABLE 5

Effects of the degree of polymerisation of the main chain

| Example | Dosage* | Slump flow at 5 minutes (mm) | Viscosity at 5 minutes (s) |
|---------|---------|------------------------------|----------------------------|
| C       | 0.30    | 300                          | 20                         |
| D       | 0.37    | 300                          | 24                         |
| 8       | 0.25    | 315                          | 16                         |
| 9       | 0.25    | 320                          | 17                         |
| 10      | 0.25    | 315                          | 16                         |

*in % dry weight/weight of cement

It is seen that the reduction in the degree of polymerisation of the main chain of the dispersant copolymer allows a reduction in the viscosity of mortar formulations. In Examples 8, 9 and 10 concerning a copolymer whose main chain has a degree of polymerisation of 35, the reduction in viscosity obtained is about 20% compared with Examples C and D in which the main chain of the copolymer has a degree of polymerisation of 47. Furthermore, in addition to allowing a slump flow value at 5 minutes to be obtained that is of the same order together with a reduction in viscosity, the copolymer whose main chain has a degree of polymerisation of 35 is used at a dosage that is about 16% lesser than the dosage of the copolymer whose main chain has a degree of polymerisation of 47.

The invention claimed is:

1. Process for lowering the viscosity of hydraulic cement compositions, comprising the addition to the hydraulic composition of a (co)polymer comprising a main chain, essentially consisting of (meth)acrylic units, and polyoxyalkylated side chains containing statistically-distributed hydrophobic units as an adjuvant, wherein the main chain has a degree of polymerisation of 15 to 45, and the mean molecular weight of the side chains is between 500 and 5000 g/mol.

2. The process according to claim 1, wherein the weight average molecular weight of the (co)polymer is 10 000 to 50 000 g/mol.

3. The process of (co)polymers according to claim 1, wherein the hydrophobic units are oxypropylene and oxybutylene groups.

4. The process according to claim 3, wherein the hydrophobic units are oxypropylene groups.

5. The process according to claim 1 wherein the (co)polymer comprises (meth)acrylic units of following formula (I):

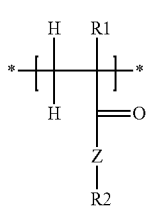

wherein:
R$^1$ is hydrogen or methyl;
Z is O or NH; and
R$^2$ is H or an alkyl, aryl, alkylaryl, arylalkyl group with 1 to 20 carbon atoms, or -Q-R$^3$ group in which R$^3$ is H or an alkyl, aryl, alkylaryl, arylalkyl group with 1 to 20 carbon atoms, and Q is of formula (II):

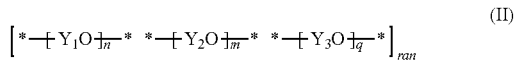

wherein:
Y$_1$ represents an alkylene group with 2 carbon atoms;
Y$_2$ represents an alkylene group with 3 carbon atoms;
Y$_3$ represents an alkylene group with 4 carbon atoms;
n is an integer of 1 to 100;
m is an integer of 0 to 150;
q is an integer of 0 to 150; and
(n+m+q) is an integer of 1 to 500,
bearing in mind that the (co)polymer of formula (I) comprises at group in which in or q>0.

6. The process according to claim 5, wherein the (co)polymer is obtained by radical polymerisation of a (meth) acrylic monomer of following formula (Ia):

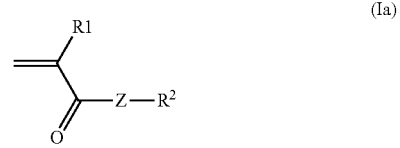

wherein the substituents R$^1$, Z and R$^2$ have the same meaning as for formula (I) in claim 5.

7. The process according to claim 6 wherein in the formula (Ia), Z is an oxygen.

8. The process according to claim 6 wherein in the formula (Ia), R$^2$ is a -Q-R group in which R$^3$ is a methyl or ethyl group.

9. The process according to claim 5 wherein in the formula (I), Z is an oxygen.

10. The process according to claim 5 wherein in the formula (I), R$^2$ is a -Q-R$^3$ group in which R$^3$ is a methyl or ethyl group.

11. The process according to claim 5, wherein in formula (II) R$^2$ is a -Q-R$^3$ group in which n varies from 1 to 100 and m varies from 1 to 75 and q equals 0.

12. The process according to claim 1, wherein the (co) polymer dosage is adjusted so that the content of hydrophobic groups in the composition of the hydraulic binder is between 0.02 and 0.5% by weight relative to the weight of binder.

13. The process according to claim 1, wherein the (co) polymer is obtained using a method in which the following are caused to react in the presence of water and at a temperature of between 120 and 250° C.:
at least one polycarboxylic acid obtained by polymerising at least one unsaturated carboxylic acid; and
at least one polyether containing a free hydroxyl group capable of reacting with a carboxylic function of the said polycarboxylic acid,
the catalyst being an alkaline or alkaline-earth salt of a strong protic acid.

* * * * *